March 16, 1965 C. O. MALLINCKRODT 3,174,142
SIGNAL CORRELATION SYSTEM
Filed Sept. 5, 1961 5 Sheets-Sheet 1

CHARLES O. MALLINCKRODT
INVENTOR.

BY
FRASER & BOGUCKI
ATTORNEYS

March 16, 1965 C. O. MALLINCKRODT 3,174,142
SIGNAL CORRELATION SYSTEM
Filed Sept. 5, 1961 5 Sheets-Sheet 2

CHARLES O. MALLINCKRODT
INVENTOR.

BY
FRASER & BOGUCKI
ATTORNEYS

March 16, 1965   C. O. MALLINCKRODT   3,174,142
SIGNAL CORRELATION SYSTEM
Filed Sept. 5, 1961   5 Sheets-Sheet 3

CHARLES O. MALLINCKRODT
INVENTOR.

BY
FRASER & BOGUCKI
ATTORNEYS

March 16, 1965  C. O. MALLINCKRODT  3,174,142
SIGNAL CORRELATION SYSTEM
Filed Sept. 5, 1961  5 Sheets-Sheet 4

CHARLES O. MALLINCKRODT
INVENTOR.

BY
FRASER & BOGUCKI
ATTORNEYS

March 16, 1965  C. O. MALLINCKRODT  3,174,142
SIGNAL CORRELATION SYSTEM
Filed Sept. 5, 1961  5 Sheets-Sheet 5

CHARLES O. MALLINCKRODT
INVENTOR.

BY FRASER & BOGUCKI
ATTORNEYS

United States Patent Office 3,174,142
Patented Mar. 16, 1965

3,174,142
SIGNAL CORRELATION SYSTEM
Charles O. Mallinckrodt, Los Angeles, Calif., assignor to Thompson Ramo Wooldridge Inc., Canoga Park, Calif., a corporation of Ohio
Filed Sept. 5, 1961, Ser. No. 136,109
24 Claims. (Cl. 340—174.1)

This invention relates to signal correlation systems, and more particularly to systems for correlating input signals against reference signal patterns to identify the occurrence of selected characteristics. This application is a continuation-in-part of my previously filed application dated June 22, 1959, Serial No. 821,884 now abandoned.

Many electronic systems now use signal correlation to identify the occurrence and nature of predetermined characteristics in complex multifrequency signals. For example, signals derived from a communication system, a ranging system or the like may have time varying components which are at least partially mutually coherent, with respect to other signals of like derivation or with respect to reference signals. The signal components may be at least partially obscured by random noise, but may also consist solely of noise. The advantages of signal correlation systems result from the fact that mutually coherent components can be employed to obtain discernible output indications even though the random noise components may be comparatively very strong. Signal correlation is much more accurate than a mere comparison of signal patterns to identify similarities, because correlation uses a mathematically determinable relationship by which the signal to noise ratio is effectively improved.

The correlation relationship between two time varying electrical signals is determined by the integral, over a selected interval, of the products of the two signals. A function, known as the correlation function, is defined by the variations in the correlation relationship which arise over a range of relative timing displacements between the two signals, including the maximum correlation relationship in which the mutually coherent components are in time coincidence. Correlator systems usually employ a variable delay device for changing the relative timing displacement, tau ($\tau$), together with a multiplier circuit to which the two time varying electrical signals are applied, and an integrating circuit for time averaging the product signal from the multiplier circuit over a selected interval. Different types of correlators are known, but broadly speaking all correlators derive correlation output signals which distinguish the point of maximum correlation on the relative timing displacement scale by virtue of a unique output signal deviation at that point.

The present invention is concerned with the provision of signal correlators in which an input signal which is thought or known to contain certain characteristics may be correlated against a reference pattern. The input signal and the reference pattern may be said to contain mutually coherent signal components when the spectral power distribution contained in one and represented by the other contains a complex multifrequency component which substantially conforms to a given amplitude versus time function, although possibly differing in peak amplitude.

The problems involved in identifying a given amplitude versus time function in an input signal are appreciable. Usually, a conventional correlator system is used for this purpose, with the reference pattern and input signal pattern being separately recorded and then correlated with varying relative timing displacements. Adequate time must be permitted to locate the proper value of $\tau$, however, and so a great deal of equipment is needed if the input signals are continuous or received at a high information rate. A number of correlators or signal storage devices must be used under these conditions if little time is available for signal processing. For most applications the time required for the "$\tau$ search" should be kept to a minimum, and it is highly desirable to be able to provide a substantially instantaneous indication of the occurrence of a selected amplitude-versus-time characteristic in an input signal.

In accordance with the present invention, an input signal may be correlated against a fixed or variable reference pattern representative of a known amplitude versus time function. The input signal is recorded serially along a storage member in such manner as to provide a spatial magnetic or other energy distribution representative of the complex multifrequency components of the input signal. The reference pattern is disposed opposite and substantially coextensive with a selected length of the recorded input signal pattern. A cumulative effect, constituting a correlation output signal, is derived from an interaction between elemental lengths of the recorded pattern and the spatially distributed reference pattern. This correlation output signal gives an essentially instantaneous indication of the occurrence of desired characteristics in the input signal.

In accordance with one aspect of the invention, input signal representations may be recorded on a rotating magnetic member and the reference pattern may be formed as a continuous conductor extending along the length of the recorded pattern and having a sufficiently small spacing to intercept the magnetic fields existing above the surface of the recorded pattern. The configuration of the conductor along the path is determined by that amplitude versus time function which it is desired to recognize. As the recording member moves relative to the length of conductor, voltages are induced in the conductor which represent, in instantaneous amplitude, the time averaged product of the then coextensive parts of the functions represented by the input signal and the reference pattern.

In accordance with more specific features of the present invention, an extremely accurate correlation may be obtained in a simple fashion by forming the reference pattern conductor by printing circuit techniques. The reference conductor may be extended to a desired length to control the time duration over which the signals are averaged. Additionally, the relative velocity between the recording member containing the input signal representations and the reference pattern may be changed so that frequency shift effects arising from relative movement of the signal source to the signal reception system do not prevent correlation. Different reference patterns may be substituted simply by interchanging the printed circuit elements.

A further aspect of the present invention is the arrangement of reference members as helical conductors about magnetic drums on which input signals are recorded. A drum or drums on which input signals are recorded may be moved axially along the helical reference member until a point of maximum correlation is identified.

A feature of the invention is the provision of a correlation system in which the reference pattern may be altered electronically without affecting the instantaneous correlation capability. The reference pattern may be recorded on a magnetic tape held or moving adjacent a recorded input signal pattern on a drum. At maximum correlation between the patterns, the tape is subjected to a significant force from the mutual repulsion of the recorded patterns, and the force is sensed electronically to provide an output signal indication.

A different electronically changeable reference pattern member in accordance with the invention may utilize magnetic recording elements which have variable permeability characteristics for both the reference and input signal patterns. Here again, there is a coaction between a spatial reference pattern emanating from the surface of a reference pattern member with the pattern established by the input signal. The coaction is used in conjunction with a controlled permeability change to provide magnetic flux variations which are sensed to identify maximum correlation.

A better understanding of the invention may be had by reference to the following description, taken in conjunction with the accompanying drawings, in which.

A preferred arrangement of a signal correlation system, as shown in FIGS. 1-4, derives and records complex multifrequency signals from an input signal source 10. The signals are recorded on the magnetizable surface of a magnetic drum 12, which is one example only of a cyclically operable recording member which may be used. The drum 12 is supported upon and turned by a shaft 13 driven by a motor 14, the speed of which may be adjusted between limits by a motor speed control 17. A simple form of speed controllable drive is provided by a hysteresis synchronous motor driven by alternating current signals of controllably adjusted frequency.

A pair of printed circuit reference members 20, 21 are disposed about the magnetizable surface of the drum 12 concentric with the central axis of the drum 12 and held by external supporting means (not shown) so as to be in a fixed spatial relationship to the drum 12 surface. The reference members 20, 21 each encompass a substantial part of the drum circumference, but include a gap along which magnetic heads may be mounted. The inner dimensions of the reference members 20, 21 are made slightly greater than the diameter of the drum 12, so that a radial spacing of the order of one mil is maintained between the drum 12 and the reference members 20, 21. The spacing given is merely an example, as it will be recognized that a primary consideration is that the spacing be small relative to the wavelength of the recorded signals.

Figure 1:
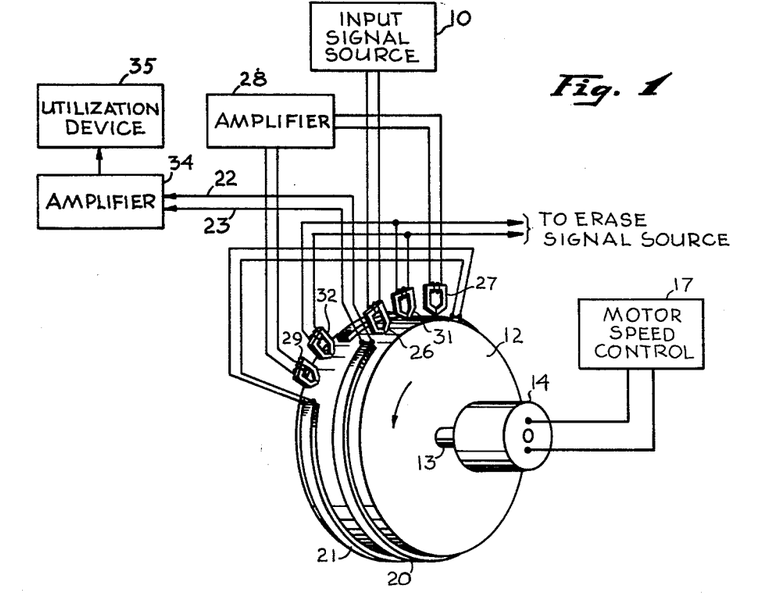
FIG. 1 represents a combined perspective and block diagram view of a form of signal correlation system in accordance with the present invention, utilizing a magnetic recording member and a printed circuit reference member.
Figure 2:
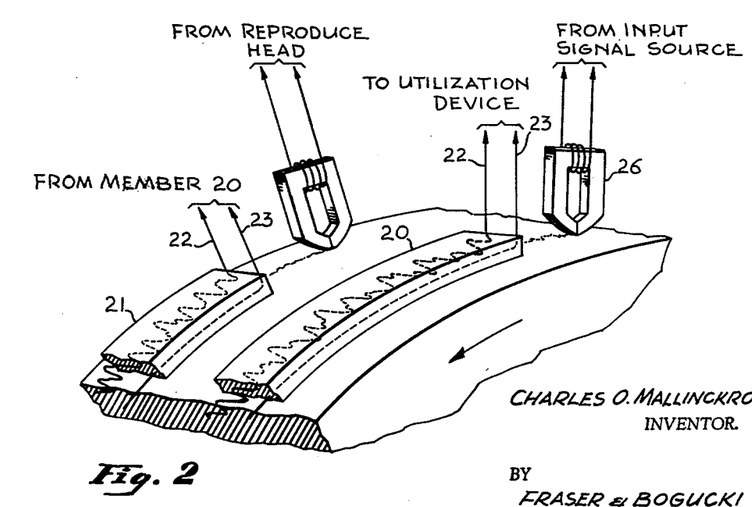
FIG. 2 is a side view of the arrangement of FIG. 1, showing the disposition of the printed circuit member relative to the magnetic recording member.
Figures 3, 4, 5:
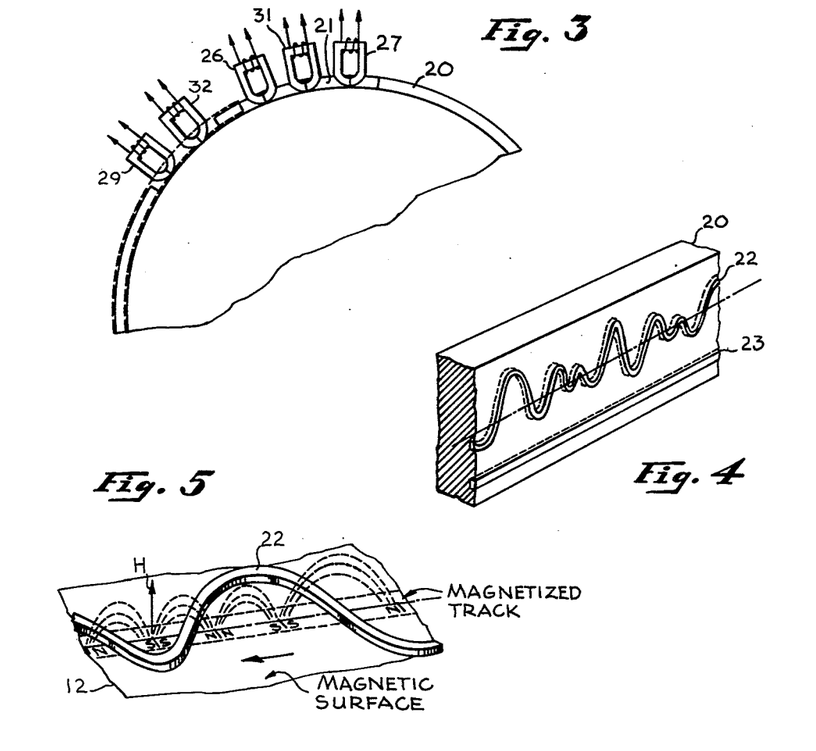
FIG. 3 is an enlarged view of a fragment of the arrangements of FIGS. 1 and 2.
FIG. 4 is an enlarged fragmentary view of a part of the printed circuit member of FIGS. 1-3.
FIG. 5 is a simplified idealized perspective view of the disposition of a part of the printed circuit conductor relative to the magnetic field of the magnetic recording member.

A continuous reference element is affixed to the inner side of the reference members 20, 21. The reference element defines a complete loop, one side of which varies transversely relative to a circumferential axis about the drum 12 in correspondence to a selected amplitude versus time function and the other side of which constitutes a return path. A segment of the reference pattern member 20 is shown in greater detail in FIG. 4, in which a sensing conductor 22 corresponding to the given amplitude versus time function and a return conductor 23 appear in fragmentary form to illustrate the reference element. The single continuous loop formed by the conductors 22, 23 extends about a first one of the reference members 20 and then about the second reference member 21, with the two conductors 22, 23 being joined at the far end of the second reference member 21. As best seen in FIG. 4, elemental lengths of the sensing conductor 22 have either or both longitudinal and transverse components relative to the drum circumference along which they lie, while the return conductor 23 is solely longitudinal relative to the drum circumference. The simple or complex waveform to which the sensing conductor 22 corresponds may be affixed in the printed circuit reference member 20, 21 by conventional printed circuit techniques, including etching and deposition. The backing material constituting the body of the reference members 20, 21 may be of any suitable non-magnetic non-conductive and dimensionally stable material. Aluminum oxide coated by a flame spray process on a stainless steel backing has exceptional properties and is preferred, although a number of other materials, such as glass fiber reinforced polystyrene, are also suitable. The relative dimensions of the various elements shown in FIGS. 1-4 are not drawn to scale, but have been selectively enlarged for clarity.

Electrical signals provided from the input signal source 10 are recorded successively in two peripheral tracks which are juxtaposed adjacent the two printed circuit reference members 20, 21. Signals are recorded in a first track lying in the plane of the circumferential axis of the first reference member 20 by a recording head 26 which is coupled to the input signal source 10. Recording amplifiers and bias circuits which may be used in conventional fashion have been omitted for simplicity.

A playback head 27 is positioned in the same track and reproduces signals which are coupled through an amplifier 28 to a recording head 29 which lies along the circumferential axis of the second reference member 21. A pair of erase heads 31, 32 are positioned in advance of the separate recording heads 26, 29 so as to completely eliminate previously recorded signals. The relative disposition and coupling of the different heads is shown in best detail in FIG. 2, although the circumferential positions of the heads in the two tracks may be varied as desired.

The terminals of the sensing conductor 22 and the return conductor 23 are coupled through an amplifier 34 to an appropriate utilization device 35 which may include a threshold circuit adjusted to discriminate against random noise conditions.

In the operation of the arrangement of FIGS. 1-4, a complex multifrequency input signal is used to establish a corresponding recorded pattern which extends along the two tracks on the magnetic drum 12. Although the pattern is disposed along the two tracks, it represents essentially continuous information. Thus, the pattern recorded in the first track by the record head 26 in a first cycle of the drum 12 is transferred to the second track during the second cycle by the second recording head 29 in response to signals reproduced by the playback head 27. The transfer of the previously recorded pattern to the second track approximately doubles the input signal duration which is used in correlation. Additional tracks may also be used if desired.

The total recorded pattern which exists at any instant on the magnetic drum 12 surface is therefore essentially continuous, and is serially disposed along selected paths to which the reference members are very closely adjacent. Furthermore there is a spatial distribution of magnetic fields above the surface which corresponds to the input signal. The relative movement between the recorded pattern and the adjacent reference member is along the path of the recorded pattern, so that at each different instant in time there is a different measurement made between the configuration of the sensing conductor 22 and the configuration of the recorded pattern. More precisely, a great many individual measurements are made at any instant, by the coaction of elemental lengths of the sensing conductor 22 with the elemental lengths of the spatially distributed pattern above the drum 12 surface.

The nature of these measurements may be better understood by reference to the enlarged and simplified view of FIG. 5, in which the sensing conductor 22 is shown in operative relationship to the adjacent recorded pattern on a magnetized track which lies along the indicated centerline of a magnetic drum 12. The recorded pattern is represented, for more ready visualization, by successive bar magnet elements (greatly enlarged) which may be taken to represent the configuration of magnetic dipoles following recording. The sensing conductor 22 which generally follows the centerline has elemental segments which are either transverse or longitudinal, or both, to the centerline. The conductor 22 is close enough to the drum 12 surface to intercept vertical components (H) of magnetic flux in the space immediately above the drum 12 surface. At each instant in time, therefore, the magnetic flux lines cut transverse segments of the sensing conductor 22 to generate voltages therein. The cumulative voltage representative of the total contributions from the separate elemental lengths of the sensing conductor 22 constitutes, as shown below, the correlation output signal.

When the input signal from the input signal source 10 contains components which are mutually coherent with the reference complex multifrequency wave, a signal indicative of the correlation relationship is provided from the amplifier 34 to the utilization device 35. If the signal from a remote source is subject to doppler shift because of relative movement between the remote source and the signal correlation system, the mutually coherent signal components may be identified by causing the speed control 17 to change the drum 12 speed during the reception of successive signals in a predetermined pattern. If only a relatively brief sequence of signals is available for analysis, the signals may be recorded on a continuous loop recorder or like mechanism and successively repeated for the signal correlation system, with the speed of the drum 12 being shifted a controlled amount on each repetition.

The manner in which this arrangement correlates the function represented in spatial coordinates by the sensing conductor with that represented in spatial magnetic field distribution by the recorded pattern may now be explained in detail with reference to FIG. 5. The fringing magnetic fields about the idealized bar magnet elements have both normal (H) components and longitudinal components. The elemental lengths of the sensing conductor 22 have transverse segments which cut the normal components of the flux so as to induce an E.M.F. in the whole conductive loop of which the sensing conductor 22 is a part. The correlation output signal is represented by a cumulative total of the E.M.F.'s which are induced in the elemental lengths.

It should be noted first that the input signal current from which the recorded pattern is obtained provides normal magnetic field components which are approximately proportional to the derivation of the signal current and not to the current itself. This derivative value results, of course, from the normal recording process. The correlation relationship may be determined from either directly representative or derivative values, with the directly representative values being obtained simply by integrating the signal current prior to recording. In the following examples the derivative functions are employed. The approximate proportionality results because of the fact that the flux lines are seldom truly normal to the recording surface. Equalizing circuits may be used between the signal receiver and the recording head to compensate for deviations of the magnetic field from the recording current.

A selected time base may be visualized as extending along the longitudinal axis of the recorded pattern, and this may be referred to as the $t'$ scale. The waveform $S_r$ to which the sensing conductor 22 corresponds may then be expressed as a function of $t'$ as follows (assuming that the closed end of the conducting loop is in coincidence with the zero mark on the $t'$ scale):

$$S_r = F_r(t')$$

A $y$ axis may then be selected, with the zero value for the $y$ axis being coincident with the longitudinal axis of the recorded pattern and the sensing conductor 22, so that the distance $y$ from any point on the sensing conductor to the centerline may be represented as:

$$y = aF_r(t')$$

where "$a$" has a numeric value which depends upon the choice of units. When the zero point on the $t'$ scale is not in coincidence with the closed end of the conductive loop the formula for $y$ is:

$$y = aF_r(t' + T_1)$$

where $T_1$ is a constant which is negative. The zero point on the $t'$ scale may be moved toward the closed end of the conductive loop and $T_1$ will be taken as positive when the zero point has passed beyond the closed end of the conductive loop.

The input signal, $S_i$, which is recorded on the magnetic member is expressed in terms of the $t'$ time scale as:

$$S_i = F_i(t')$$

With the longitudinal type of magnetic recording described in this example, the intensity of the normal component, H, is approximately proportional to the derivative of the recording current a short distance above the surface of the material. The sensing conductor 22 is closely enough spaced to the recording pattern for this relationship to hold substantially true. Accordingly, the formula of H may be written as follows:

$$H = b\dot{F}_i(t')$$

where "$b$" is a quantity whose numeric value depends upon the choice of units.

The E.M.F. induced in an arbitrary elemental length of the sensing conductor 22 may be developed relative to the selected distance $\Delta t'$ along the $t'$ time scale. With a distance $\Delta t'$ small enough for the sensing conductor 22 segment to be a straight line, the formula for $\Delta y$ then is:

$$\Delta y = a[\dot{F}_r(t' + T_1)]\Delta t'$$

If then $\Delta E$ represents the E.M.F. induced in the elemental length of the sensing conductor 22 by the movement of the recorded pattern relative to it, then $$\Delta E = vH(\Delta y)$$

where "$v$" is dependent on the units involved. H and $\Delta y$ may now be replaced by the equivalent expressions previously given, and the expression may be rewritten to give the E.M.F. induced in an elemental length of the conductive loop as follows:

$$E = vk[\dot{F}_i(t')][\dot{F}_r(t' + T_1)]\Delta t'$$

where "$k$" is used in place of the product $ab$. The total voltage derived at the output terminals of the conductive loop equals the algebraic sum of all the voltages obtained from the like elemental lengths of the conductive loop.

Hence the output voltage or correlation output signal E is given by the following expression:

$$E = v\rho \int_{T_1}^{T+T_1} \dot{F}_i(t')[\dot{F}_r(t'+T_1)]dt'$$

Figure 7:
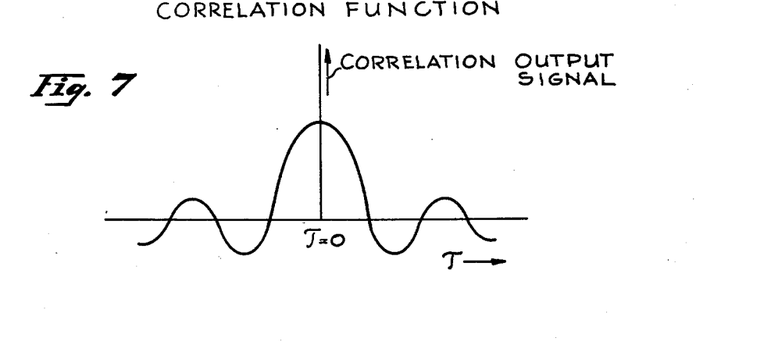
FIG. 7 is a plot, of correlation output signal versus relative timing displacement, which illustrates an idealized correlation function.

The integral given immediately above may be seen to express the correlation relationship, in terms of the product of two functions integrated between selected limits. The two functions are the derivative of the reference signal and the derivative of the input signal. The limits of integration, $T_1$ and $T+T_1$, correspond to the two ends of the reference pattern. Although the output voltage is given as a function of the parameter $T_1$, the relationship between $T_1$ and real time ($t$) is given by $T_1 = t - T - T_2$, where the zero values of $t$ and $t'$ are assumed to be coincident and $T_2$ represents the time required for the pattern representative of a recorded signal to move from the recording point to the closest point of the conductive loop which defines the reference member. An idealized curve representative of the sin $X/X$ variation which characterizes the correlation function of signals having essentially constant energy distribution within a finite band of frequencies is shown in FIG. 7. When the introduced relative timing displacement brings the signals at the multiplier to the point of maximum correlation, note that the envelope of the form sin $X/X$ modulates a cosine signal, in the full expression of the correlation function, and that negative values $\tau = 0$ are folded over to the positive side, as far as the correlation output signal is concerned.

When it is desired to use the normal signal function, instead of the derivative function the input signal may be integrated prior to recording, as is well-known, by passing the signals through a network whose loss increases at the rate of 6 db per octave across the transmission band. The reference pattern then should represent the integral of the selected amplitude versus time function.

The complex reference wave member may be fabricated in any of a number of ways. Complex multifrequency waves may be electrically recorded on an oscillographic device, or magnetically recorded so that a magnetic powder may be affixed to provide the desired visible representation. After converting these patterns to suitable photographic images, they may be used directly or with other processing stages to fabricate a printed circuit reference member. The reference pattern may accordingly be made extremely small without losing precision. The size of the reference member is merely one of the parameters which may be controlled, however. The speed of rotation and diameter of the drum may also be selected in dependence upon the frequency band occupied by the unknown input signal, the nature of the input signal and its duration.

Figure 6:
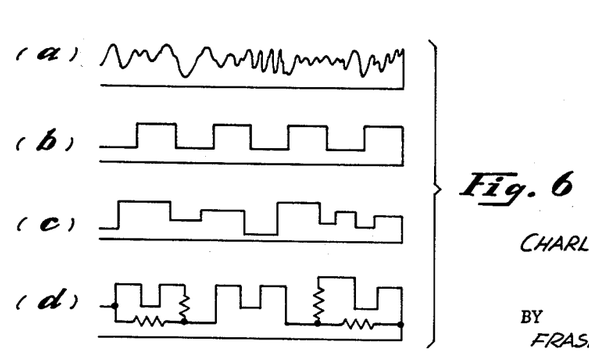
FIG. 6 is an idealized representation of different configurations for the conductor of a printed circuit reference member, showing different amplitude versus time functions which may be simulated.

Examples of various shapes which the reference pattern may assume are to be found in the waveforms illustrated by the various conductive loops shown in FIGS. 6(a)–6(d). A complex multifrequency wave deposed about the center axis is illustrated in FIG. 6(a). Very often, however the amplitude versus time function which it is desired to identify may be represented by a rectangular waveform such as the symmetrical square wave of FIG. 6(b). It should be noted that with a square rectangular wave the integral previously given is not applicable because the transverse sides have infinite slope. In order to accurately represent the output voltage of this form of reference pattern, it is merely necessary to express the output voltage in the form of a series with finite numbers of terms. Each term thus represents the voltage ($E_1$) induced in an elemental length of the conductive loop corresponding to the vertical edge of a rectangular waveform. The formula of this output voltage is:

$$E_1 = kvlH$$

where "$l$" is the length of a transverse edge of any rectangular part of a reference pattern. Different amplitude versus time functions may be represented by rectangular variations, either by changing the lengths of the various longitudinal and transverse segments as shown in FIG. 6(c), or by using resistive intercouplings, as shown in FIG. 6(d).

Figure 8:
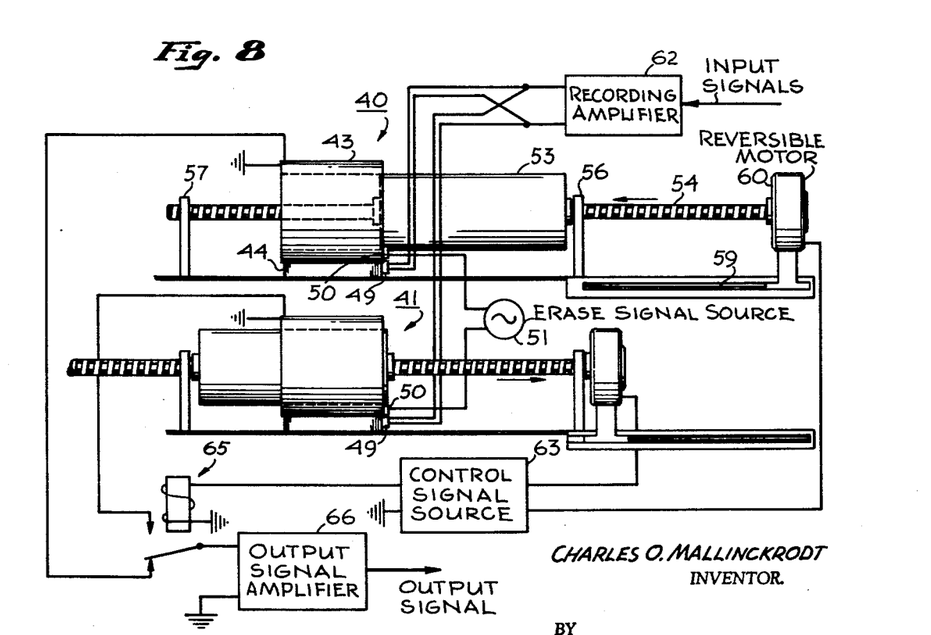
FIG. 8 is a combined schematic and block diagram representation of a signal correlation system using a pair of printed circuit reference members and magnetic recording members.
Figure 9:
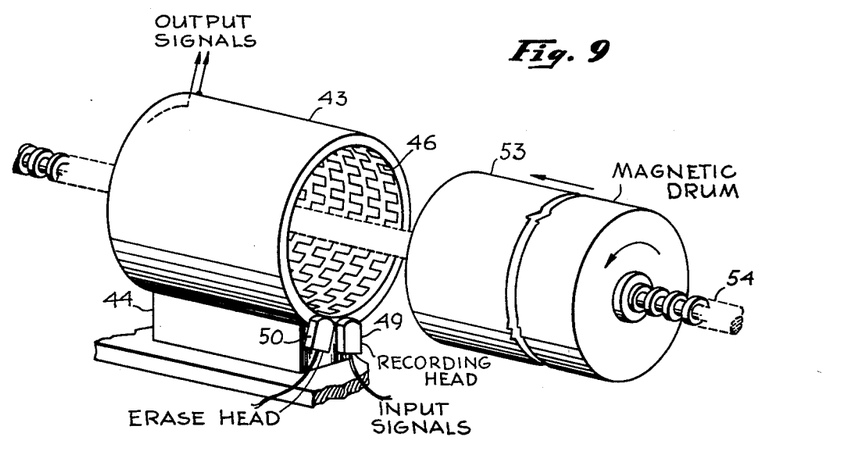
FIG. 9 is an enlarged perspective view, partially broken away, of a fragment of the arrangement of FIG. 8.

A different form of correlator system in accordance with the invention is shown in FIGS. 8 and 9. This system makes feasible the use of an extremely long reference pattern, so that the time averaging interval used in the correlation function is also extremely long, and also permits a different form of continuous operation. As will be evident from the detailed description, however, the separate halves of the system may be operated independently.

In the system of FIGS. 8 and 9, which are shown in somewhat simplified form, first and second instantaneous correlators 40 and 41 are employed in complementary fashion. Inasmuch as the correlators 40, 41 have substantially like elements and relationships, and are subject to like variations, only the first of the correlators will be described in detail. As in the arrangement previously described, this system uses a printed circuit conductor as the reference member. The reference member is mounted in a stator or sleeve 43 which has the configuration of a hollow, non-conducting cylinder, mounted on a support base 44. The reference member is a preformed conductor 46 which is disposed on the inner wall of the stator 43 and follows a helical path about the central axis of stator 43. An enlarged square wave has been shown as the configuration of the conductor 46, but this is merely for simplicity and for ease of representation, and it will be understood that a much smaller and usually more complex waveform will be employed for most applications.

For recording signal patterns on a magnetic recording member which is to be moved in opposed facing relation to the reference member, a recording head 49 is mounted adjacent what may be called the entry end of the stator 43. An erase head 50 is positioned adjacent the recording head 49, and prior to the recording head 49, relative to the associated magnetic member, so as to provide improved recording. The erase head 50 is coupled to an erase signal source 51.

A magnetic drum 53 is again used as the magnetic recording medium for receiving recorded patterns which are representative of the input signals. The magnetic drum 53 is mounted to move coaxially with the central axis of the stator 43, by a coupled threaded shaft 54 which moves through fixed support members 56, 57 on the base 44. Advance of the magnetic drum 53 is made through the entry end of the stator 43 by turning the shaft 54 through a reversible motor 60 which is slidably mounted on a sliding track part 59 of the base 44. The concurrent axial and circumferential movement of the magnetic drum 53 relative to the record head 49 at the entry end of the stator 43 causes the recorded pattern disposed about the magnetic drum 53 to conform to a helical path which registers with the helical path followed by the conductor 46. The motor 60 may be a constant speed device, such as synchronous motor driven from constant speed source, but may also be variable in speed as well as reversible. Speed variation may of course be obtained by driving motor 60 with signals from a variable frequency source.

In this arrangement, the magnetic drum 53 has an outside diameter which is slightly less than the internal diameter of the stator 43 which contains the conductor 46. The spacing between the magnetic drum 53 and the stator 43 is preferably that which is used by good magnetic recording and reproducing equipment.

Input signals which are to be recorded for correlation are provided to the recording heads 49 of each of the correlators 40, 41 through a recording amplifier 62. The couplings from the recording amplifier 62 are cross-connected so that each of the recording heads 49 is energized continually, although useful recordation may not be taking place.

The axial movement of the magnetic drums 53 and the correlators 40, 41, and the utilization of the signals from the conductors 46, is governed by a control signal source 63 which controls the motors 20 so that the advancing movement of each drum 53 is carried out for a selected period of time. The control signal source 63 also provides control signals to a switch 65 of the single pole double throw type which selectively couples output signals derived from each conductor 46 during the interval in which the associated magnetic drum 53 is advancing through the stator 43. These signals are provided through an output signal amplifier 66 as the correlation output signals from the system.

The system of FIGS. 8 and 9 continuously monitors an input signal by correlating the input signal with the function represented by the reference pattern conductor 46. The magnetic drums 53 alternate in passing through their respective stators 43 from the entry end. The helically disposed recorded pattern about the periphery of drum 53 is representative of the input signal, and moves serially along the conductor 46, which is representative in configuration of the given amplitude versus time function. As in the arrangement of FIGS. 1–4, the spatial magnetic field distribution immediately adjacent the magnetic drum 53 surface extends through the conductor 46, so that the flux lines are cut and voltages are induced in the conductor. The greater length of the reference conductor 46 merely, in effect, extends the limits between which the integration is carried out and thereby enhances the signal to noise ratio of the correlation output signal. Otherwise the analysis above presented is the same for this mechanism.

When a drum 53 has reached the end of its reciprocating motion relative to the stator 43, the other magnetic drum is at the opposite end of its travel and ready to commence movement through its associated stator. At this point in time the control signal source 63 applies signals to reverse the motors 60 and operate the switch 65 to the opposite pole. The correlation thus continues without interruption.

Any of a number of alternative arrangements may be employed under varying circumstances. The use of a single magnetic drum and stator has been mentioned above. In addition, the mechanism by which the rotating drum is advanced at a controlled rate through the stator may be changed considerably. A positive lead screw drive may be used for the forward motion. This screw drive may be disengaged to provide a fast return of the drum to the start position. By this means, considerable overlap in the operation of the separate drum systems may be provided, thus insuring that the coextensive lengths of recorded pattern and reference pattern conductor are always in excess of a predetermined minimum.

Figure 10:
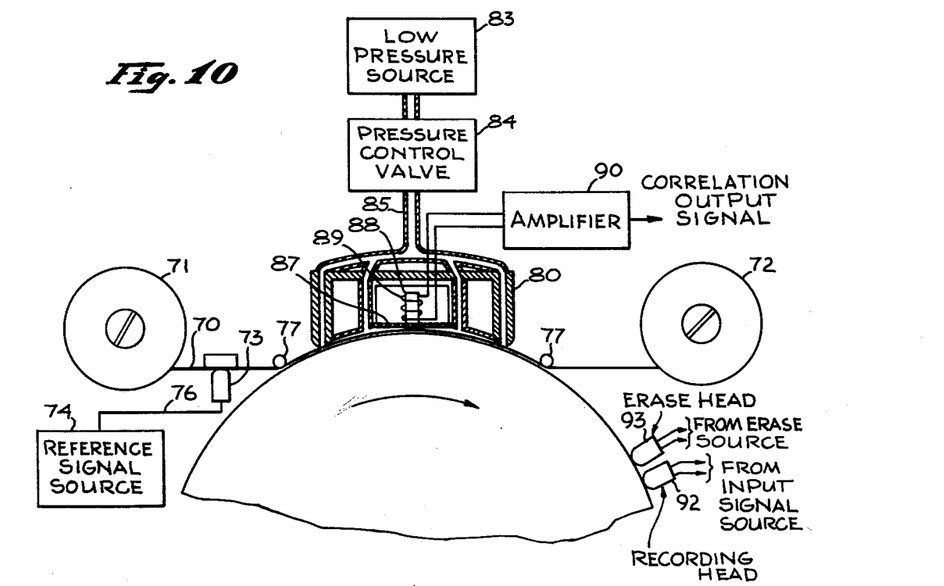
FIG. 10 is a sectional view of a signal correlation system using a magnetic tape reference member in accordance with the invention.

The arrangement of FIG. 10 discloses a signal correlation system in which the reference signal pattern is electronically variable. Representations of the reference signal are recorded on a magnetic tape 70 which is fed from a supply reel 71 to a take-up reel 72. On the side adjacent the supply reel 71, the tape moves past a recording head 73 which is energized from a reference signal source to provide the reference signal patterns. Subsequently, the tape 70 is held in an arc which substantially conforms to the outer periphery of a magnetic drum 76 by spaced apart pinch rollers 77. Between the pinch rollers 77, the tape 70 is held in position under a stationary head 80, the outer periphery of which defines a boundary about the tape 70. The tape is held against the edges of the stationary head 80 by a maintenance of a suitably low pressure from a low pressure source 83 controlled by a pressure control valve 84 through a system of conduits 85 coupled into the edges and the interior of the head 80. The conduits 85 coupled into the interior of the head 80 hold the tape 70 in balance slightly off the surface of the drum 76. A diaphragm 87 centrally placed within the head 80 is spaced apart from the balanced segment of the tape 70 and defines therewith an acoustic chamber. A light magnet 88 fixed to the diaphragm 87 is encompassed by a pickup coil 89 which provides signals to an amplifier 90 which represent the correlation output signal from the mechanism.

Assuming that a desired reference signal pattern has been magnetized on the tape 70 by the head 73 under control of the reference signal source 74, and that this segment of the tape 70 is then held under the stationary head 80, the following action transpires. As the controlled pressure from the source 84 holds the tape segment in balance spaced slightly away from the drum 76 surface, the drum 76 is rotated as input signals which are to be correlated against the reference signals are recorded by the record head 92. The acoustic chamber between the diaphragm 87 and the flexed portion of the tape 70 which is under the head 80 is readily responsive to changes in volume which result from flexure of the tape. Flexure of the tape in turn is a cumulative effect representative of the instantaneous product of the repulsion and attraction of the various opposed facing recorded patterns. The total modification introduced into the acoustic chamber represents the products of all the opposed facing elemental lengths, and consequently provides a correlation of the two amplitude versus time functions which are represented by the recorded patterns. The diaphragm 87 and magnet 88 move correspondingly, to induce a voltage in the pickup coil 89 which is amplified as the correlation output signal.

In order to change the reference signal pattern, all that need be done is to feed another segment of tape 70 past the recording head 73 as it is energized by the reference signal source 74, and then to place this segment under the stationary head 80.

It will be recognized by those skilled in the art that the function performed by the mechanism disposed under this stationary head 80 is essentially that of a sensitive microphone, or more generally speaking a mechanical to electrical transducer. Accordingly, a wide variety of different mechanism may be utilized for performing this transducing action. The transduction may be accomplished capacitively, piezoelectrically, or in many other ways. The use of a direct conversion to electrical energy without the use of other mechanical elements is a particularly attractive alternative. In such an arrangement, the cyclically moving record member on which input signal representations are recorded is mated by an appropriate transducer, such as barium titanate member, having a magnetic surface on which reference signal patterns may be recorded. Changes in the pressure on the barium titanate member resulting from attraction and repulsion of the recorded patterns during relative movement of the two members again provide the correlation output signal. Note also that instead of using a low pressure source to maintain the tape in balance adjacent the drum, the periphery of the drum may be provided with small apertures through which air may be forced under pressure to maintain the tape in a desired floating relationship during rotation of the drum.

Figure 11:
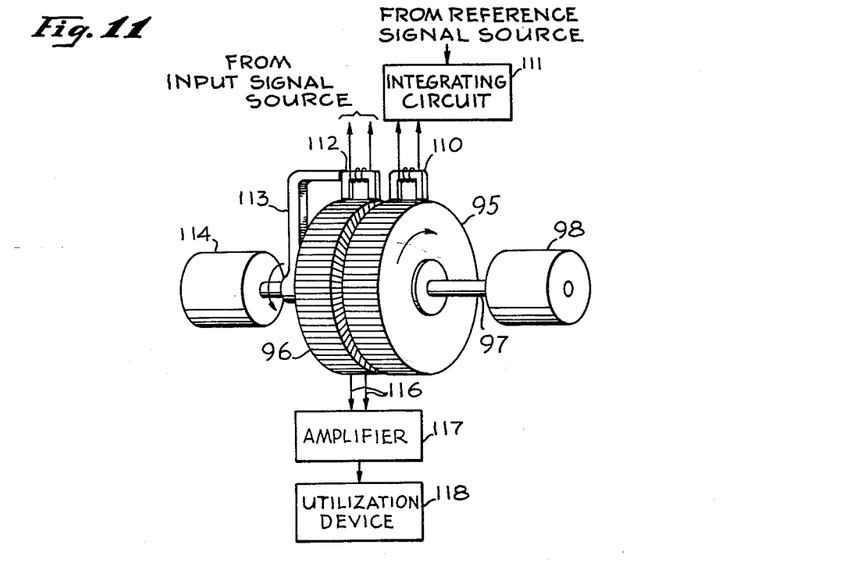
FIG. 11 is a perspective view, partly broken away, of a signal correlation system in accordance with the invention utilizing a variable permeability reference member.
Figure 12:
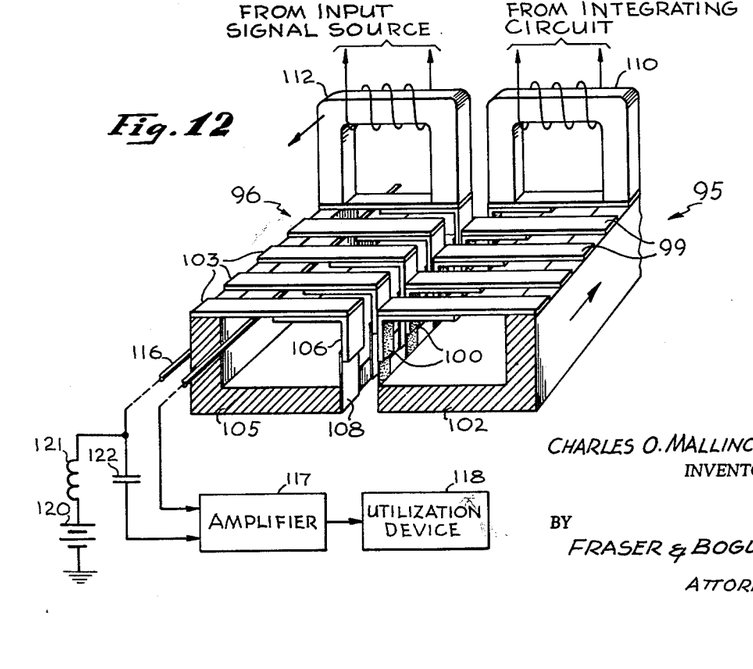
FIG. 12 is an enlarged view of a fragment of the arrangment of FIG. 10.

A different signal correlation system in which the reference pattern may be varied electronically is shown in somewhat simplified form in FIG. 11, and in enlarged detail in the fragmentary view of FIG. 12. The system employs a pair of drums 95, 96 which are coaxially positioned and very closely adjacent, having opposing side faces which are spaced apart a relatively minute distance, such as two or three mils or less. A first of the drums 95 is mounted upon a shaft 97 driven by a motor 98 at a selected rate of speed. The second drum 96 is held stationary about the shaft 97.

Details of the construction of the rotating and stationary drums 95, 96 respectively may be seen more clearly by reference to FIG. 12. Much of the construction has been greatly enlarged for clarity and is not to scale. The recording surface for the first drum 95 extends circumferentially about the drum, but separate, transverse, magnetic paths are defined by using separate bars 99 of a magnetic material (e.g. a conventional recording material) which is capable of retaining a high degree of magnetization. At the side adjacent the second drum 96, separate brackets 100 are spaced along the drum 95 circumference. These brackets 100 are of soft magnetic material, such as permalloy, and provide magnetic coupling to like members of the second drum 96. The brackets 100 are separated by a gap from an L-shaped ferrite block 102 which provides support for each element and also provides a relatively high permeability return path which has low retentivity.

The recording surface of the second drum 96 is likewise broken up into discrete segments by transverse bars 103 mounted on an L-shaped ferrite block 105. Separate brackets 106 are coupled to the bars 103 to provide a low reluctance coupling between the transverse magnetic paths in the two drums 95, 96. The spacing between the brackets 100, 106 which is shown in FIGS. 11 and 12 is not intended to be to scale. The transverse magnetic paths of the second drum 96 differ from those of the first by the presence of variable permeability elements between the brackets 106 and the ferrite block 105. These consist of thin strips 108 of permalloy or like material which extend between the brackets 106 and the block 105. A variable permeability characteristic is established because the strips are sufficiently thin (approximately 0.1 mil) to be driven to saturation by relatively low magnetic fields. In contrast, the bars 99, 103 and the brackets 100, 106, may be approximately 1.0 mil thick.

A representation of the reference signal is circumferentially recorded on the rotating drum 95, by a fixed recording head 110 which is positioned to span the bars 99 so as to provide transverse magnetization patterns. Reference signals are applied to energize the fixed head 110 from a reference signal source (not shown), after passage through a circuit 111 which effectively provides the integral of the reference signal function. An erase mechanism (not shown) may be employed to insure the absence of residual magnetization patterns as the reference signal is recorded.

The input signals are provided from a source (not shown) to a recording head 112 which is rotated about the stationary drum 96 on an arm 113 turned by a motor 114. The rotating head 112 is also configured and mounted to provide transverse magnetization patterns on the bars 103 on the drum 96. Erase mechanisms for the recording tracks and sliding contacts between the input signal source and the rotating head 112 have not been illustrated.

As best seen in the fragmentary view of FIG. 12, the ferrite member 106 of the stationary drum 96 is encompassed by a conductive sensing loop 116 (e.g. copper wire) which extends along the length of the recording track. E.M.F.'s induced in the sensing loop 116 are coupled through an amplifier 117 to a utilization device 118. In order to use the variable permeability characteristic most effectively, a D.C. bias is applied to the sensing loop 116 from a D.C. source 120 through an inductance 121. A D.C. blocking capacitor 122 in the coupling to the amplifier 117 permits only A.C. components to appear in the output signal. The D.C. bias insures that the thin strips vary between substantially zero magnetization and saturation magnetization for opposite directions of magnetization of the associated recording bars 103.

The operation of the system of FIGS. 11 and 12 proceeds by derivation of a correlation output signal from the conductive loop 116 as the drum 95 bearing the reference signal representation and the drum 96 bearing the input signal representation are moved relative to each other. The thin strips 108 act as variable permeability shunts to the transverse magnetic paths in both drums 95, 96. The permeability of each thin strip 108 is primarily controlled by the direction of magnetization of the associated bar 103 as determined by the input signal. With a given polarity of recorded signal and a given D.C. bias the thin strip 103 is driven to saturation and therefore at a low permeability. The magnetization of an opposing bar 99 on the rotating drum 95 therefore establishes a maximum flux (of either direction) in the part of the fixed drum 95 which the sensing loop 116 encompasses. Conversely, a bar 103 which is oppositely magnetized to the example just given results in a maximum shunting of the flux from the rotating drum 95, and a minimum effect at the part of the drum 96 encircled by the sensing conductor 116.

The preceding discussion is concerned only with instantaneous relationships. A maximum rate of change of flux (and therefore a maximum generated E.M.F.) at the sensing loop 116 may, however, be seen to exist when the recorded patterns represent mutually coherent signal components. As an illustration, assume that the recorded signals are identical and further that the direction of magnetization of successive bars 99, 103 on each drum 95, 96 alternates between polarities. At one instant in time all bars 99 of a given polarity are opposite low permeability thin strips 108, and thus provide discrete fluxes with the sensing loop 116. At this same instant in time each bar 99 of the other polarity is opposite a high permeability thin strip 108, so that its magnetic flux seeks the shunting path. At the next instant in time, however, the bars 99 of the second polarity are opposite the low permeability thin strips 108, so that the discrete fluxes now within the sensing loop 116 are all reversed. Under these conditions there is a maximum rate of change in the total flux encompassed by the sensing loop 116, and a maximum E.M.F. is generated. It is also apparent that the discrete fluxes within the sensing loop 116 will tend to cancel out if the magnetization patterns bear a random relationship to each other.

It may now be shown that the signal derived at the output terminals of the conductive loop 116 may properly be considered to be the correlation output signal. Assume that the transversely magnetized elemental lengths along the recorded tracks are of small dimension relative to a wavelength of the recorded reference signal, and that the distance between the elemental length and the recorded reference track is likewise small compared to a wavelength. Then the amount of flux, $\phi$, which links the conductive loop has a value determined by:

$$\phi = k_1 B_r (\mu_1 + \mu_2) \text{ maxwells}$$

where $k_1$ is a constant which depends upon the dimensions of the magnetic materials and upon the spacing between the elemental length and the reference member; where $B_r$ is the residual flux density, in gauss, in the elemental length of magnetic material (being positive or negative here depending upon the direction of magnetization); $\mu_1$ is the average value of transverse permeability of the reference member (here assumed to be constant), and $\mu_2$ is the variable portion of the transverse permeability of the reference member adjacent the elemental length, and varies as a function of time because of the relative movement of the members.

The voltage, V, at the output of the conductive loop is proportional to the rate of change of magnetic flux:

$$V = \frac{d\phi}{d_t} \times 10^{-8} = k_1 B_r \frac{d\mu_2}{d_t} \times 10^{-8} \text{ volts}$$

$\mu_2$ is here made proportional to the integral of the reference signal, and if $S_2$ represents the reference signal, then $\mu_2$ may be expressed as:

$$\mu_2 = \int S_2 dt$$

Inserting the above expression for $\mu_2$ in the above formula, the output voltage is derived as $$v = k_1 B_r S_2 \times 10^{-8} \text{ volts}$$

It may therefore be seen that the output signal is proportional at any instant of time to the product of the reference signal and the residual magnetization of $B_r$ of the elemental length. The output signal derived from the system of FIGS. 11 and 12 is then obtained by integrating the voltages derived from the successive elemental lengths, as follows:

$$V_1 = k_1 10^{-8} \int_0^s B_r S_2 dx \text{ volts}$$

where $V_1$ is the output voltage at any instant of time, $s$ is the length of the recorded reference pattern, and where $B_r$ and $S_2$ are considered to be functions of the distance $x$ from the end of the recorded reference track rather than functions of time. The output voltage therefore is representative of the correlation function of the unknown input signal with respect to the reference signal, and the correlation interval is $s/v$ seconds.

Two requirements should be borne in mind in utilizing such systems. First, a large number of cycles of the input and reference signals must be stored in the magnetic tracks. With a suitable figure being 100 cycles per inch, conventional drum sizes (6 inches in diameter and above) provides sufficient capacity. It is a feature of the present invention that the reference pattern may be varied electronically as described. Thus, the system is capable of high speed correlation of input signals with many desired reference signals, and may, of course, be used for determining the relative timing displacement between signals emanating from the same source but derived at the process station through different paths.

Another advantage of the arrangement of FIGS. 11 and 12 is that the idealized antistropic magnetization conditions are closely approximated by a mechanism which is readily fabricated of commonly available materials. The coupling between the two recorded tracks is sufficiently close to provide an appreciable output signal at a maximum correlation relationship. These output voltages may be increased by using a number of turns instead of a single conductive loop.

The foregoing analysis shows that mechanisms in accordance with the invention may be provided in a number of different ways, as long as there is an interaction between the elemental length of the opposed recorded patterns, and a cumulative output signal indication which is provided. Other constructions than those shown in FIGS. 11 and 12 may be employed for providing an anistropic characteristic, for example.

In general, systems in accordance with the invention may be considered to be wave analyzing systems. If the reference waveform is configured or established to represent a particular frequency, then the system operates as a band pass filter of high sensitivity. The correlation output signal therefore does not exclude use of the system for this specific purpose.

Although a number of modifications have been discussed in conjunction with the provision of instantaneous correlators using opposed input signal and reference patterns, it will be appreciated that a number of other expedients may also be employed. Accordingly, the information should be considered to include all modifications and alternative forms falling within the scope of the appended claims.

I claim:

1. A correlator system for instantaneous correlation of an input signal containing complex multifrequency components against a reference signal and including means for recording input signal representations in the form of a magnetic pattern on a recording surface, the recorded pattern providing spatially distributed magnetic field components adjacent the recording surface, and reference pattern means representing a selected amplitude versus time function moving adjacent to the recording surface and coacting with the magnetic field components adjacent the recording surface, the reference pattern means including means providing a cumulative indication of the relationships between elemental lengths of the reference pattern means and the recorded magnetic pattern.

2. A correlator for substantially instantaneously identifying the occurrence of selected amplitude versus time characteristics in an input signal, including the combination of storage means responsive to the input signal for providing a spatial energy distribution representative of the input signal, reference pattern means adjacent the storage means and configured in accordance with a selected amplitude versus time characteristic, the reference pattern means coacting with the spatial energy distribution, and means coupled to the reference pattern means for providing a cumulative indication of the instantaneous correlation relationship between the input signal and the reference pattern.

3. An instantaneous correlator for correlating input signals with a selected amplitude versus time function, including cyclically operable storage means receiving the input signals and providing a serially disposed stored magnetic pattern having spatially distributed fringing field variations therealong, reference means extending along and proximate to the magnetic pattern and within the fringing field thereof, the reference means being fixed relative to the storage means, and having a reference pattern thereon which substantially conforms to the selected amplitude versus time function, and means coupled to the reference means for deriving a cumulative indication of the degree of registration between elemental lengths of the magnetic pattern and opposed elemental lengths of the reference pattern.

4. A correlation system including the combination of a reference member having a serially disposed pattern thereon representing time varying characteristics of a first waveform, a signal storage member in adjacent and opposed facing relation to the reference member, the signal storage member including serial patterns representing the time varying characteristics of a second waveform, means for moving the signal storage member adjacent the reference member such that the serial patterns move along their serial lengths and in coupling relation to each other, means coupled to the reference member for deriving a cumulative indication of the extent of registration of the patterns representing the first and second waveforms, and means for varying the relative speed of movement of the signal storage member relative to the reference member.

5. A signal correlation system comprising a first signal member having a pattern which represents in spatial serial disposition the time varying characteristics of a first waveform, a second signal member having a pattern representing in spatial serial disposition the time varying characteristics of a second waveform, means for moving the first member relative to the second member with the spatially disposed patterns moving along their serial lengths relative to each other and in coupling relation to each other, and means coupled to at least one of the signal members for providing a cumulative output indication of the registration relationship between elemental serial segments of the patterns.

6. A signal analyzing device comprising a first signal storage surface means having a first signal waveform impressed thereon, a second signal storage surface means having a second signal waveform impressed thereon and being positioned substantially adjacent said first signal storage surface means, motive means for providing relative motion between said first and second signal storage means in a direction to search for substantial coincidence of mutually coherent signal components in the first and second waveforms, means for providing a response when substantial coincidence occurs between the mutually coherent signal components of the first and second signal waveforms, and means adjacent said signal storage surface means for changing the waveform impression on at least one of said signal storage surface means.

7. A signal analyzing device comprising a first signal storage surface means having a first signal waveform impressed thereon in a serial disposition, a second signal storage surface means having a second waveform impressed thereon in a serial disposition and being positioned substantially adjacent said first signal storage surface means, motive means for providing relative motion between said first and second signal storage surface means in a direction along the serial disposition to search for coincidence between mutually coherent signal components of the first and second signal waveforms, and coincidence response means for providing a response when coincidence occurs, said first signal storage surface means comprising a conductor formed to a predetermined pattern and said signal storage surface means comprising a magnetic surface.

8. A signal analyzer comprising conductor means representing in spatial distribution a predetermined signal pattern of known waveform, the conductor means being serially disposed along a selected length, magnetic signal storage means for storing an input signal pattern in a spatial distribution, said magnetic signal storage means being positioned cooperatively adjacent and in opposed facing relation to said conductor means along at least a portion of the length thereof for inducing voltages in the conductor means, motive means for driving said magnetic storage means in a selected speed relationship to the conductor means, sensing means coupled to the conductor means for providing an output signal when mutually coherent signal components exist between the predetermined signal pattern and the input signal pattern, and means for changing the speed relationship provided by the motive means.

9. A correlator system including magnetic drum means responsive to input signals for providing recorded input signal representations along at least one track on the drum, and sensing conductor means disposed along the tracks carrying the input signal representations and intercepting fringing fields thereof, the sensing conductor means being configured to correspond to a selected amplitude versus time function.

10. A signal analyzing device comprising a first signal storage surface means having a first signal waveform impressed thereon, a second signal storage surface means having a second signal waveform impressed thereon and being positioned substantially adjacent said first signal storage surface means, motive means for providing relative motion between said first and second signal storage surface means in a direction to search for coincidence between the waveforms, and coincidence means for indicating when substantial coincidence occurs between the waveforms, said first signal storage surface means comprising a conductor having selected lengths describing predetermined waveform characteristics.

11. An instantaneous correlator comprising a recording device having a magnetizable recording surface, means responsive to input signals for recording input signal patterns in at least one track on the recording surface, thus to provide a spatial magnetic field distribution adjacent the recording surface which includes a varying component which is vertical to the recording surface and determined by instantaneous amplitudes of the input signal, a conductive member disposed along and adjacent to the recording surface along the path of the recording pattern and intercepting the vertical component of the spatially distributed magnetic field adjacent the recording surface, the conductive member having a configuration in transverse and longitudinal segments relative to the recording track corresponding substantially to a reference amplitude versus time function, such that transverse segments of the conductive member intercept vertical magnetic field components to induce voltages in the conductive member which represent cumulatively the product of the amplitude versus time functions to which the input signal pattern and reference pattern most closely correspond, thus to provide an instantaneous correlation output signal.

12. An instantaneous correlator for correlating input signals with a given amplitude versus time function comprising a recording device having a magnetizable recording surface, means responsive to the input signals for recording input signal patterns in at least one track on the recording surface, thus to provide a fringing magnetic field representation of the input signal serially along the recording surface, a fixed conductive magnetic field sensing member disposed coextensive with at least a part of the track on which the representations of the input signal are recorded, the conductive member being within the fringing fields and varying longitudinally and transversely relative to the recording track in accordance with the given amplitude versus time function, such that the cumulative voltage induced in the conductive member is a measure of the degree of registration between transverse components of elemental lengths of the conductive member and vertical fringing field components of elemental lengths of the recording track, and means coupled to the conductive member for providing a correlation output signal indication.

13. An instantaneous correlator for correlating input signals with reference signals including the combination of a cyclically operable magnetic recorder, means responsive to the input signals for providing recorded patterns along the magnetic recorder, reference signal magnetic recorder means disposed adjacent the magnetic recorder, the reference signal magnetic recorder means providing a length of magnetizable medium in opposed facing and proximate relation to at least a portion of the recorded patterns, and there being relative movement between the opposed lengths, means responsive to the reference signals for providing recorded patterns along the length of magnetizable medium, and transducer means coupled to the length of magnetizable medium and responsive to movements thereof resulting from the cumulative effects of interaction between the recorded patterns.

14. A correlator system for input signals and variable reference signals including first and second magnetic recording surface members, the recording surface of one of the magnetic recording members substantially mating with at least a part of the recording surface of the other, means responsive to the input signals for providing a first recorded pattern along one of the recording members, means responsive to the reference signals for providing a second recorded pattern along the other of the recording members, means for moving one of the recording members relative to the other so that one recorded pattern scans along the length of the other, and means coupled to one of the recording members for sensing mechanical forces resulting from interaction between the recorded patterns.

15. A signal analyzing device comprising a first signal storage surface means having a first signal waveform impressed thereon, a second signal storage surface means having a second signal waveform impressed thereon and being positioned substantially adjacent a length of said first signal storage means with the impressed waveforms being in opposed facing relation, motive means for providing relative motion between said first and second signal storage surface means, with the impressed waveforms moving along their lengths adjacent each other to search for a position of maximum registration between the mutually coherent signal components of the first and second signal waveforms, said first signal storage surface means comprising a member having a magnetic surface which is mechanically responsive to the waveform impressed on the second signal storage surface means, and means coupled to said first signal storage surface means for indicating when mutually coherent signal components within said first and second waveforms are in registration.

16. A signal analyzing device comprising a first signal storage surface means having a first signal waveform impressed thereon, a second signal storage surface means having a second waveform impressed thereon and being positioned substantially adjacent said first signal storage surface means, motive means for providing relative motion between said first and second signal storage surface means in a direction to search for substantial coincidence between said waveforms, said first signal storage surface means comprising a storage magnetic tape, and response means for indicating when substantial coincidence occurs between the waveforms impressed on said first and second signal storage surface means, said response means comprising an acoustical pickup means.

17. A system for correlating an input signal with a selectively variable reference signal including a pair of magnetic recording devices positioned in side by side relation, one of the devices having a variable permeability characteristic and being under the magnetic influence of recordings on the other of the devices, means for moving one of the recording devices relative to the other, means responsive to input signals and reference signals respectively for recording said signals separately on the recording devices, and means coupled to one of the recording devices for determining the degree of correspondence between the separately recorded signal patterns.

18. An instantaneous correlator receiving an input signal and a reference signal and including a first magnetic device providing a first recording track having transversely magnetizable variable permeability segments each defining a closed magnetic path, means responsive to the input signal for providing transverse magnetization representations thereof along the first recording track, a second magnetic device providing a second recording track having transversely magnetizable segments, each defining at least a part of a transverse magnetic path, the second magnetic device being disposed closely adjacent the first magnetic device and movable relative thereto with the segments of the magnetic devices being in magnetic coupling relation, means responsive to the reference signal for providing transverse magnetization representations thereof along the second recording device, and means coupled to the first magnetic device for sensing magnetization changes therein.

19. A system for providing instantaneous correlation between input signals and reference signals, each containing complex multifrequency components, with the reference signals being electronically variable, the system including the combination of a first magnetic recorder for input signals, means responsive to the input signals for recording input signal representations transversely in a selected track on the first magnetic recorder, the first magnetic recorder having anistropic magnetization characteristics, such that the permeability of traverse segments is controllable by the magnetization of the recorded pattern, a second magnetic recorder for reference signals, the second magnetic recorder being disposed coaxially with and adjacent the first magnetic recorder, means responsive to the reference signals for recording reference signal representations transversely in a selected track on the second magnetic recorder, means for moving one of the magnetic recorders relative to the other such that one track moves along the length of the other, and means coupled to one of the magnetic recorders for generating a correlation output signal from the relationships between the magnetizations of elemental lengths of the recorded tracks.

20. A system for correlating an input signal with a selectively variable reference signal including the combination of a first magnetic storage drum having a variable permeability in a direction transverse to a circumferential recording track, the permeability being controlled by a transverse recording thereon, a second magnetic storage drum positioned coaxially with and in side by side relation to the first magnetic drum, such that segments of the circumferential recording on the second magnetic drum act magnetically upon opposed segments of the first magnetic drum, means responsive to the input signals for providing a transverse recording on the circumference of one of the drums, means responsive to the reference signals for providing a transverse recording on the circumference of the other of the drums, means coupled to the drums for providing relative rotational movement therebetween, and a sensing conductor coupled to and encircling at least a portion of the magnetic segments established by the recordings on the two drums, to provide a correlation output signal.

21. The invention as set forth in claim 20 above, wherein the magnetic segments of the first magnetic drum have portions which are appreciably thinner than the magnetic recording surface of the magnetic drum and which are magnetically coupled thereto, and in which the second magnetic drum includes magnetic loop segments which are transverse to the circumferential recording.

22. A correlation system including at least a pair of reference members having configurations representative of selected amplitude versus time functions, at least a pair of input signal storage members, means responsive to input signals for recording representations of the input signals on the input signal storage members, means for moving individual ones of the signal storage members past different ones of the reference members successively and means coupled to the reference members for indicating the existence of substantially like variations in the input signals and the functions represented by the reference members.

23. A signal correlation system including a reference member including a conductive loop disposed about a central axis in a generally helical form, the configuration of one side of the loop along the helical form varying in accordance with a first function, a magnetic drum member mounted along the central axis and movable helically therealong so that recording tracks move along the helical path of the conductive loop, means responsive to the input signals for recording in the tracks on the magnetic drum, and means coupled to the conductive loop for providing a correlation output signal.

24. A signal correlation system for continuously correlating an input signal with a reference signal and including the combination of a pair of instantaneous correlators, each of the instantaneous correlators including a reference member and an adjacent magnetic member, the reference member including a reference conductor disposed along a selected path and the magnetic member including means responsive to the input signal for providing surface magnetic tracks representative of the input signals on the magnetic member, and the signal correlator also including means for advancing the magnetic member past the reference member, with the surface magnetic tracks being moved serially along the reference conductor, means coupled to the means for advancing the pair of magnetic members for advancing the magnetic members alternately past their associated reference members, and means coupled to the reference members for deriving correlation output signals from the reference conductors alternately as the associated magnetic members are being advanced.

References Cited by the Examiner
UNITED STATES PATENTS

| | | | |
|---|---|---|---|
| 2,676,206 | 4/54 | Bennett et al. | 340—15.5 |
| 2,721,990 | 10/55 | McNaney | 340—149 |
| 2,905,767 | 9/59 | Eckert et al. | 340—174.1 |
| 2,939,110 | 5/60 | Beattie et al. | 340—149 |
| 2,995,727 | 8/61 | Quade | 340—149 |
| 3,018,962 | 1/62 | Jones et al. | 235—181 |
| 3,024,994 | 3/62 | Buland et al. | 235—181 |

IRVING L. SRAGOW, *Primary Examiner.*

UNITED STATES PATENT OFFICE
CERTIFICATE OF CORRECTION

Patent No. 3,174,142                          March 16, 1965

Charles O. Mallinckrodt

It is hereby certified that error appears in the above numbered patent requiring correction and that the said Letters Patent should read as corrected below.

Column 17, line 50, for "traverse" read -- transverse --.

Signed and sealed this 30th day of November 1965.

(SEAL)
Attest:

ERNEST W. SWIDER                               EDWARD J. BRENNER
Attesting Officer                                   Commissioner of Patents

UNITED STATES PATENT OFFICE
CERTIFICATE OF CORRECTION

Patent No. 3,174,142                              March 16, 1965

Charles O. Mallinckrodt

It is hereby certified that error appears in the above numbered patent requiring correction and that the said Letters Patent should read as corrected below.

Column 17, line 50, for "traverse" read -- transverse --.

Signed and sealed this 30th day of November 1965.

(SEAL)
Attest:

ERNEST W. SWIDER                              EDWARD J. BRENNER
Attesting Officer                                    Commissioner of Patents